(12) United States Patent
Dorfman

(10) Patent No.: US 7,512,406 B2
(45) Date of Patent: Mar. 31, 2009

(54) PERSONNEL TRACKING SYSTEM

(76) Inventor: Bertrand Dorfman, 444 E. 82nd St., New York, NY (US) 10028

( * ) Notice: Subject to any disclaimer, the term of this patent is extended or adjusted under 35 U.S.C. 154(b) by 0 days.

(21) Appl. No.: 11/944,263

(22) Filed: Nov. 21, 2007

(65) Prior Publication Data

US 2008/0125159 A1      May 29, 2008

Related U.S. Application Data

(63) Continuation-in-part of application No. 11/101,237, filed on Apr. 7, 2005, now Pat. No. 7,313,411.

(60) Provisional application No. 60/559,774, filed on Apr. 7, 2004, provisional application No. 60/860,093, filed on Nov. 21, 2006.

(51) Int. Cl.
*H04Q 7/20*      (2006.01)

(52) U.S. Cl. .................................. 455/456.1; 455/457

(58) Field of Classification Search ........................ None
See application file for complete search history.

(56) References Cited

U.S. PATENT DOCUMENTS

| | | | |
|---|---|---|---|
| 4,539,706 A * | 9/1985 | Mears et al. ............... | 455/11.1 |
| 5,541,976 A | 7/1996 | Ghisler | |
| 5,564,077 A | 10/1996 | Obayashi et al. | |
| 6,014,561 A | 1/2000 | Molne | |
| 6,347,230 B2 * | 2/2002 | Koshima et al. ............ | 455/457 |
| 6,804,578 B1 | 10/2004 | Ghaffari | |
| 6,958,677 B1 | 10/2005 | Carter | |
| 7,123,149 B2 | 10/2006 | Nowak et al. | |
| 7,313,411 B2 | 12/2007 | Dorfman | |
| 2004/0192353 A1 | 9/2004 | Mason et al. | |
| 2006/0220851 A1 | 10/2006 | Wisherd | |

* cited by examiner

*Primary Examiner*—Thanh C Le
(74) *Attorney, Agent, or Firm*—Cowan, Liebowitz & Latman, P.C.

(57) ABSTRACT

The system for tracking and communicating with individuals as they move through a complex structure involves wireless communication over a first channel, called herein a front channel, between transceivers carried by the individuals being tracked and repeaters. This provides distance information signals between repeaters and transceivers within range of each other. In a second or back channel, this distance information is transmitted between repeaters until it reaches a command station. At the command station, the distance information is employed to calculate the real-time position of the individual carrying each transceiver and to plot that position on a map for display at the command station. A similar front channel and back channel approach is used to provide audio information from mobile voice communication devices carried by the individuals being tracked. Audio repeaters on a front channel communicate with these voice communication devices and on a back channel send the audio information through various audio repeaters to the other voice communication devices in the system.

16 Claims, 7 Drawing Sheets

PERSONNEL TRACKING SYSTEM

REFERENCE TO RELATED APPLICATIONS

This application is a continuation-in-part of application Ser. No. 11/101,237 filed Apr. 7, 2005 now U.S. Pat. No. 7,313,411 entitled: Wireless Communication System which in turn is an application based on Provisional Application No. 60/559,774 filed Apr. 7, 2004 to both of which this application hereby claims priority. This application also claims priority to Provisional Application No. 60/860,093 filed Nov. 21, 2006 and entitled: Tracking System. The entire disclosures of all three priority applications are incorporated herein by reference.

BACKGROUND OF THE INVENTION

This invention relates to a system for tracking individuals in complex structures and more particularly to such a system that provides enhanced security, safety and information.

The tracking of an individual in a complex structure, whether in a single building or a number of interrelated buildings, becomes particularly important where the individual being tracked is responding to an emergency such as a fire. Knowing where the individual is in the structure can be important for a number of reasons.

One reason is in case the individual needs rescuing.

A second reason is to provide a location for an individual reporting on a voice channel.

A further advantage is that location information gives an individual at a command station the ability to tell the individual being tracked where to go and where to avoid going.

It is important that any such system be relatively secure from failure and be reliable for long periods of time after it is installed.

In order for such a system to be acceptable in a wide range of structures and situations, it is important that the system be installed and maintained at a cost which will be acceptable to the proprietors of the structures involved.

It is a further object of this invention that the operation of this system and the presentation of information by the system be readily understandable to the individuals involved in operating and responding to the system.

BRIEF DESCRIPTION

In brief, a personnel tracking system is described which involves a tracking communication channel that includes the deployment of electronic repeaters at predetermined positions throughout the structural network covered by the system. These tracking repeaters provide communication with portable transceivers carried by the individual being tracked and also provide communication with a command station.

The tracking system essentially involves a command station, electronic repeaters located throughout the structure and a set of portable transceivers, one of which is carried by each individual who is being tracked. These repeaters are called tracking repeaters herein and these transceivers are called tracking transceivers herein. Each transceiver is normally in communication with a plurality of repeaters and each repeater is normally in communication with other repeaters. These relations provide assurance that communication to the command station will be completed.

A plurality of tracking repeaters will be in communication range with any one individual portable tracking transceiver. Each tracking transceiver communicates with each repeater within range to provide an indication of the distance between the repeater and the transceiver. This distance information is then sent by the repeater to the command station. Having two or more distance measurements between two or more repeaters and a particular transceiver permits a calculation of the position of the portable transceiver since the position of each repeater is known and predetermined.

At the command station, the calculated position of the individuals being tracked is displayed on a map of the structure. Since the communication between a carried transceiver and multiple repeaters is continuous, the displayed position tracks in real time with the individuals being tracked All information is transmitted by a digitally modulated signal. Digital modulation permits a greater range than would be available if analog modulation were employed.

The tracking repeaters are positioned so that transmission from any one repeater will be picked up and retransmitted by at least one, and preferably more, repeaters. Thus each repeater is designed not only to respond to communication with each portable transceiver within range but also to receive and transmit information from other repeaters within range. This system assures that all of the distance information between repeaters and transceivers is received at the command station for appropriate processing.

It is preferred that there be additional communication between the command station and the repeaters to determine that the repeaters are operating properly and do not need replacement or repair. The repeaters are battery operated and periodic interrogation from the command center is useful to determine when batteries have to be replaced. Further communication from the command center is useful to cause the repeater to operate at a greater or lesser output power level. This might be necessary in cases where some repeaters have been damaged or made inoperable so that the range of the remaining repeaters can be increased to bridge any gap that might be produced.

It is also preferred that the system incorporate an audio system to permit communication between mobile voice communication devices that are carried by the individuals being tracked. This voice system is separate from the tracking system. The voice system includes a set of voice repeaters capable of communication with mobile voice communication devices carried by the individuals being tracked. The voice system repeaters are preferably located at the same stations as are the tracking system repeaters. The mobile voice communication devices are separate from the tracking transceivers, though both are carried by the persons being tracked.

DEFINITIONS

Systems And Channels. This disclosure refers to a "tracking system" and an "audio system".

The tracking system has as its primary function the location of an individual carrying a tracking transceiver and the display of the individual's position on a map of the structure within which the individual is moving. The tracking system disclosed employs two digitally modulated channels; a front channel and a back channel.

The audio system has as its primary function the voice communication between an individual carrying a mobile voice communication device (often called a walkie-talkie) and other individuals carrying mobile voice communication devices, including one at the command center. In the embodiment disclosed, the audio system operates with analog modulation at a front channel having a first carrier frequency and with digital modulation on a back channel having a second carrier frequency.

These two systems perform different functions and, in general, employ separate hardware. It should be understood that each of these systems may employ two or more channels in which the channels perform separate functions.

The tracking channel is multiplexed to provide a sub-channel for checking on the status of the tracking system repeaters and/or controlling the output power of the tracking system repeaters.

The audio system channels are multiplexed to provide communication over different carrier frequencies for different audio signals. The communication between audio repeaters is preferably by digital modulation on a back channel. The back channel can be multiplexed to provide housekeeping including checking the status of the audio channel repeaters and/or controlling the output power of the audio channel repeaters.

Repeaters. The term repeaters is used to refer to electronic devices which receive a signal on one frequency, demodulate the signal and retransmit that signal modulated on another frequency.

The tracking system repeaters not only provide distance information signals from those tracking transceivers within range but also receive distance information signals from other repeaters and retransmit those signals onto repeaters in range and to the command station when it is in range.

The audio system repeaters convert mobile voice communication device signals to a digitally modulated signal which is then transmitted to the digital component of other audio channel receivers in range and to the command station when it is in range. The audio system repeaters also convert the digitally modulated signals received from other repeaters to an audio modulated signal for retransmission to only relatively locally located mobile voice communication devices. Thus the audio system repeaters receive and retransmit voice information.

Digital Modulation. This term refers to most if not all pulse modulation techniques. It is particularly adapted to modulation of relatively high frequency carriers.

Analog Modulation. This term refers to FM, AM and phase modulation.

Complex Structures. The structures to which this invention is particularly adapted for use are those in which line of sight transmission is not feasible. These are generally structures having many levels and irregular corridors and rooms as are often found in an opera house. Some such complex structures may even be a set of closely related individual structures. The term complex structure is intended herein to refer to a wide variety of structural arrangements which require a system that can be adapted to the particular structural features of the building. This adaptation is in part provided by the fact that the repeaters receive and send in a wireless fashion so that the repeaters can be placed wherever it is useful to assure coverage of the structure.

Front Channel. Both tracking and audio systems use front channel to provide communication between their respective repeaters and the signal originating devices carried by the person being tracked. The signal originating device is the transceiver in the tracking system and the mobile voice communicating device in the audio system.

Back Channel. Both tracking and audio systems use a back channel to provide communication between repeaters to assure that the information signal is received at a command station.

DESCRIPTION OF THE PREFERRED EMBODIMENTS

Figure 1:
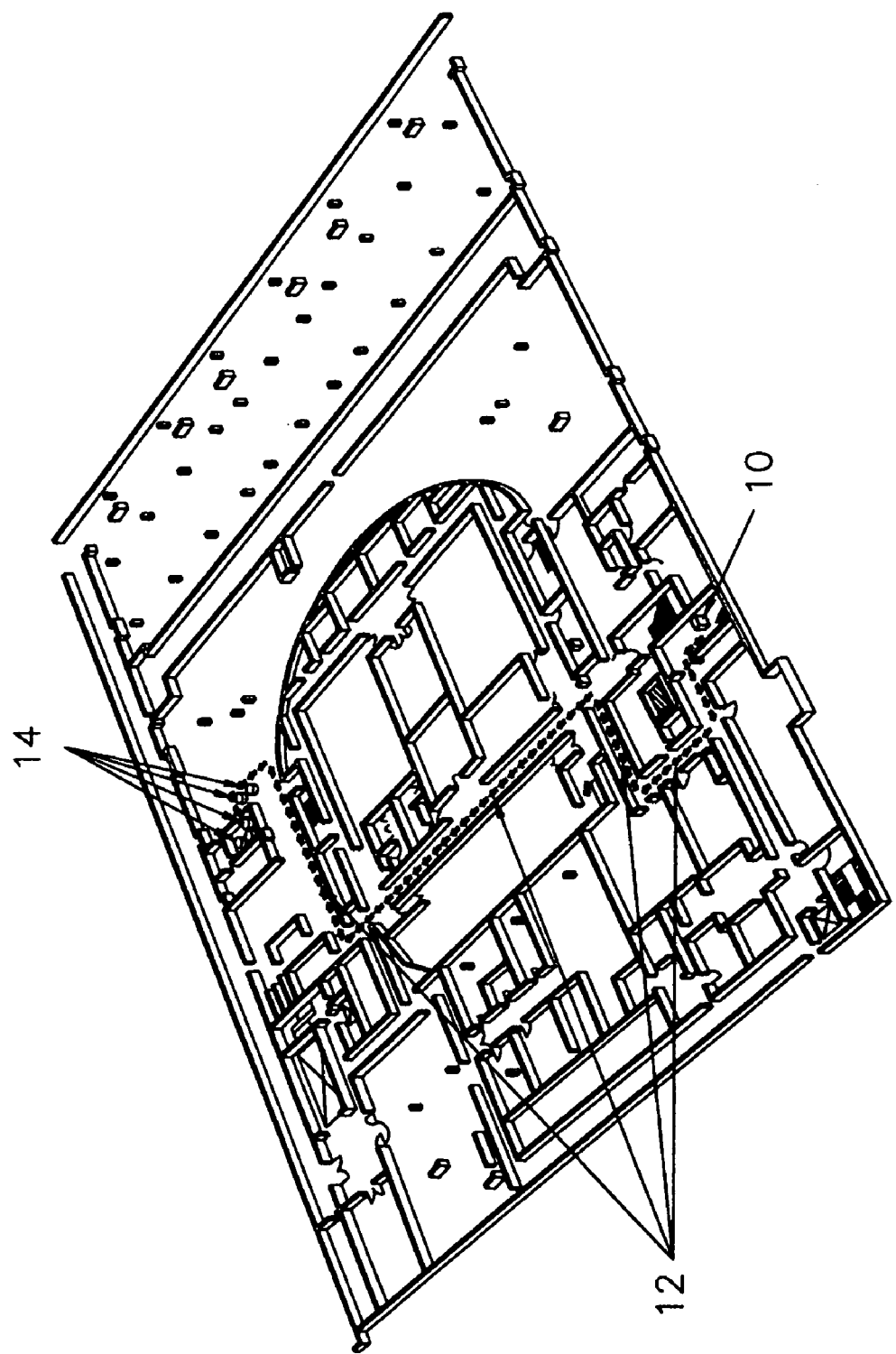
FIG. 1 is a schematic illustration of a typical complex structure (in this case, an opera house), showing the deployment of a command station 10, emergency workers carrying tags for tracking transceivers 14 and a set of tracking repeaters 12. Command station 10 includes an electronic display of a map.

The FIGs. all illustrate a single embodiment. The system enables the tracking of an individual in complex structures containing walls, floors, ceilings and other structural barriers to signal transmission. This tracking is done in a wireless fashion so as to minimize cost and maximize assurance of operational ability.

The tracking system has a command center 10, a plurality of tracking repeaters 12 located at fixed positions within the structure and a tracking transceiver 14 carried by each person being tracked. The transceiver can be worn as a tag by the individual.

The command center 10 is in wireless communication with tracking repeaters 12 within range of the command center. The tracking repeaters 12 are also in wireless communication with various tracking transceivers 14 carried by the individuals being tracked that are within range. The tracking transceiver 14 carried by a person being tracked must be in communication with at least two tracking repeaters 12. This is so that distance information from the person carrying the tracking transceiver 14 to at least two tracking repeaters 12 will be obtained for ultimate transmission to the command center 10 where a calculation of the position of the individual carrying the tracking transceiver 14 can be made.

The system is a synchronous system so that the time it takes signals from the tracking transceivers 14 to be received at the repeaters 12 in range is used to provide a distance information signal at the repeaters 12. In the preferred embodiment, the communication between transceivers 14 and repeaters 12 is on a digitally modulated carrier channel at a first carrier frequency. This first carrier channel is the front channel.

This distance information signal is demodulated at the repeaters 12 and then digitally modulated onto a carrier channel having a second carrier frequency. This channel is a back channel. This second carrier frequency digitally modulated signal carrying distance information is sent out by wireless communication from each tracking repeater 12 to all tracking repeaters 12 in range. Each tracking repeater that receives a distance information signal, retransmits the signal and, at some point, the distance information signals are received at the command station 10 where a calculation of position can be made by known, essentially triangulation type, techniques.

The relationship between the tracking repeaters 12 and the tracking transceivers 14 provides distance information that permits determining the position of the individual carrying a tracking transceiver 14. The interoperability between the tracking repeaters assures that this distance information will get back to the command center 10. The command center 10 can then through appropriate triangulation type calculations determine the location of the individual carrying the tracking transceiver 14 and can place that position on a map retained in the memory of the command center 10. This map can be displayed and the position of the individual being tracked will appear to move along a path through the map to provide real time indication of the location of the individual being tracked.

On a separate, digitally modulated relatively high frequency carrier, the command center 10 can interrogate the various repeaters 12 to determine operability and also affect power output of a particular repeater in order to compensate for defective adjacent repeaters.

In a preferred system, there will be a voice system. The voice system will involve a number of voice repeaters 18, each of which can be positioned at the same location as a tracking repeater 12. The voice system is adapted to provide communication between the voice repeaters 18 and mobile voice communication devices 20. The mobile voice communication devices 20 are normally carried by the person being tracked to provide voice communication with other such devices 20 and/or with the command station 10. The term "walkie-talkie" is often applied to certain of these devices 20. The voice repeaters 18 are in analog communication with those devices 20 within range. However, to assure that a voice communication is received at all devices 20, and at the command center 10, it is important that the voice repeaters 18 provide a function analogous to that provided by the tracking repeaters 12. Thus, each voice repeater 18 demodulates the analog signal received from a voice device 20 and digitally modulates a carrier for digital communication through the set of voice repeaters 18 until the signal is received by the command center 10. Thus each voice repeater 18 has a receiver on its front channel for receiving analog modulated signals from the mobile devices 20 and a receiver on its back channel for receiving digital modulated signals from other voice repeaters 18. Each voice repeater 18 also demodulates received back channel messages and remodulates them on the front channel for reception by mobile voice devices 20 in range.

A header is employed in the signals sent between tracking repeaters 14 and in the signals sent between voice channel repeaters 18 so that when a repeater 14,18 sees the same header twice, it ignores the signal and thus the circulating of any particular signal is limited.

Figure 2:
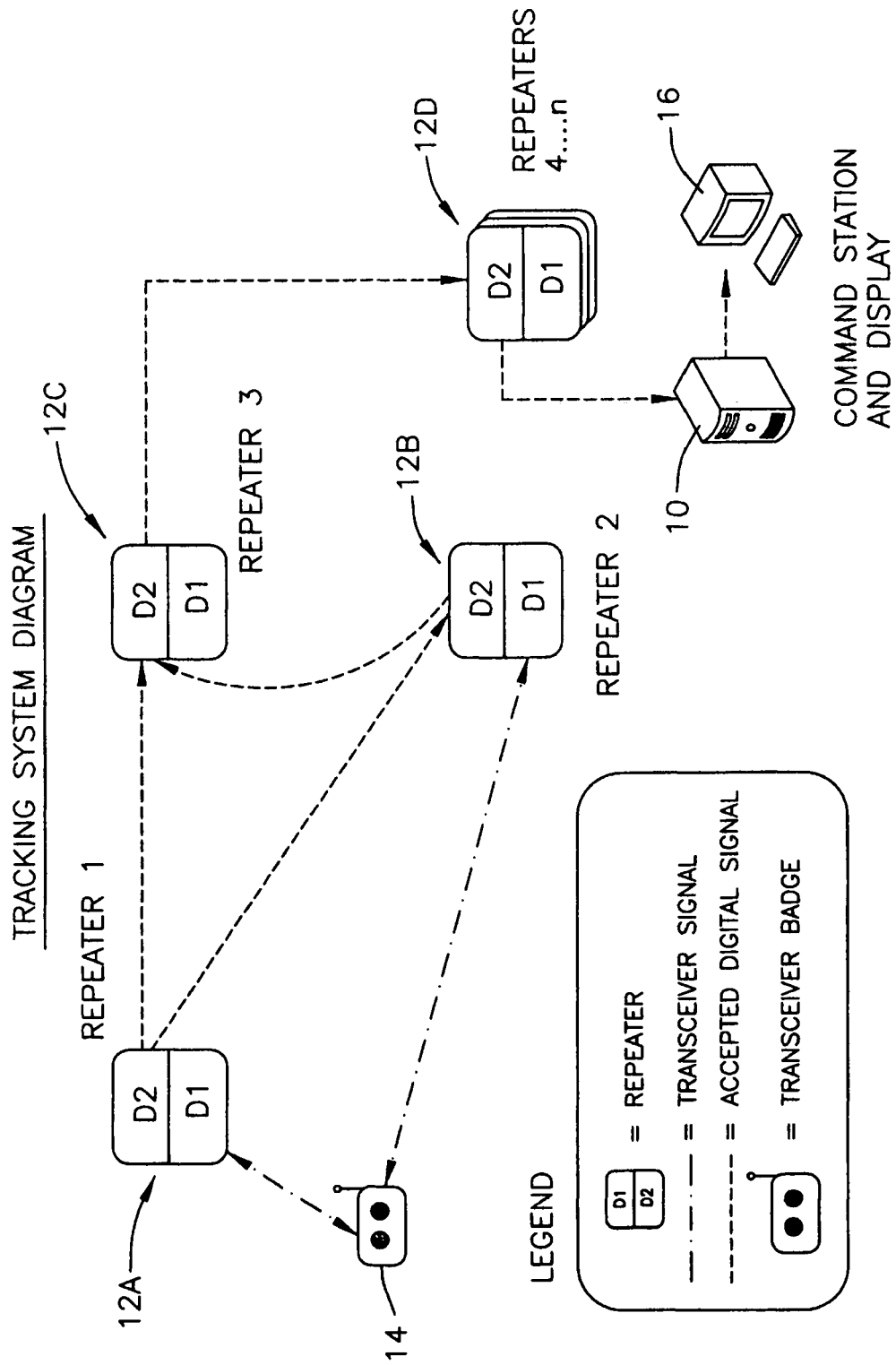
FIG. 2 is a tracking system diagram showing various tracking repeaters 12, each having a digitally modulated front channel D1 and a digitally modulated back channel D2, as well as a portable transceiver 14 and the command station 10 with its display unit 11.

FIG. 2 illustrates the operation of the tracking system in connection with a single tracking transceiver 14. The tracking transceiver 14 is in communication range with a first tracking repeater 12A and a second tracking repeater 12B. Signals from the transceiver 14 are received in the front channel D1 of the repeaters 12A and 12B. These digitally modulated signals are demodulated at the repeaters 12A and 12B and remodulated on the carrier frequency of the back channel D2. These remodulated back channel signals from the repeaters 12A and 12B are transmitted to the back channel D2 of repeater 12C. Because these repeaters are within range, the back channel signal from the repeater 12A is received at the repeater 12B and the back channel signal from the repeater 12B is received at the repeater 12A. However, these signals are rejected because their header information indicates to the respective repeaters that the signal has already been processed by that repeater. The back channel signal is further transmitted from the repeater 12C to other repeaters shown at 12D. At least one of these repeaters will be within range of the command center 10 where the back channel signals indicating distance will be processed to provide a presentation of the individual being tracked on a map shown at a screen 16. As indicated in FIG. 2, the front channel D1 is a digitally modulated signal and the back channel D2 is also a digitally modulated signal.

Figure 3:
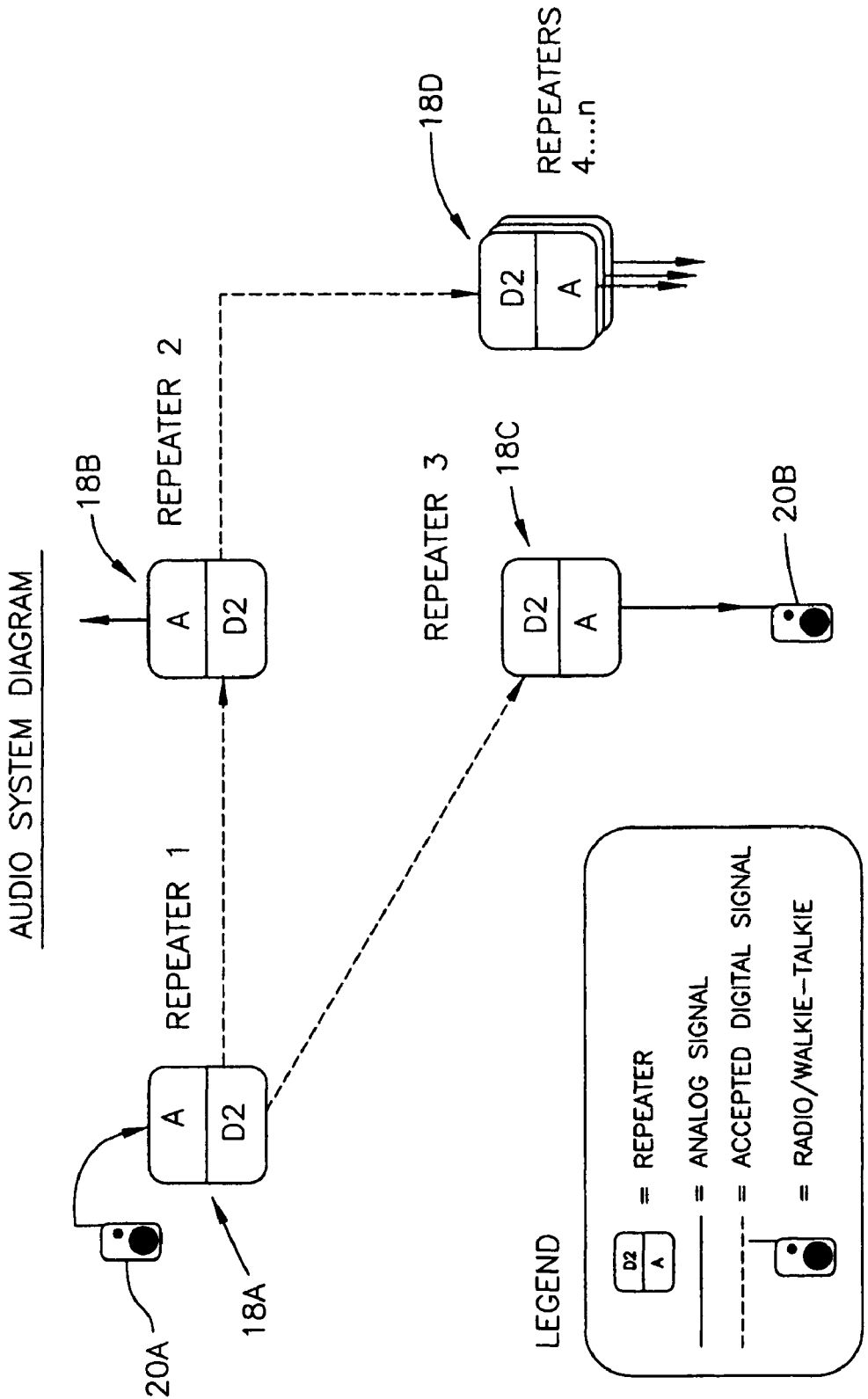
FIG. 3 is an audio system diagram similar to that FIG. 2, except that it deals with the audio system. The voice system repeaters 18 are preferably positioned at each location where there is a tracking repeater 12. Mobile voice communication devices 20 with which the system communicates are illustrated, as is the analog front channel A and the digital back channel D2.

FIG. 3 illustrates an operation of the audio system showing three repeaters 18A, 18B and 18C; each having an analog modulated front channel A and digitally modulated back channel D2. A signal from a mobile voice communication device 20 is received at the front channel of the first repeater 18A. The signal is demodulated and digitally remodulated onto the back channel for transmission to the back channel of the repeaters within range 18B and 18C. These back channels at first, second and third repeaters 18A, 18B and 18C retransmit the digitally modulated signal to the other repeaters. But a signal is rejected, because based on a header reading, if the repeater involved recognizes it as a second reception.

As shown in FIG. 3, the third repeater 18C is in the front channel range of the mobile voice communication device 20B thereby providing communication to other such devices 20 from the particular device 20A. The second repeater 18B is shown as also putting out a signal on its audio or front channel. But since no mobile voice communication device 20 is in range, that signal has no effect.

The information on channel D2 is forwarded through various back channels of other repeaters 18D within range of the back channel D2 to assure reception of the audio information at all mobile voice communication devices 20.

Figure 4:
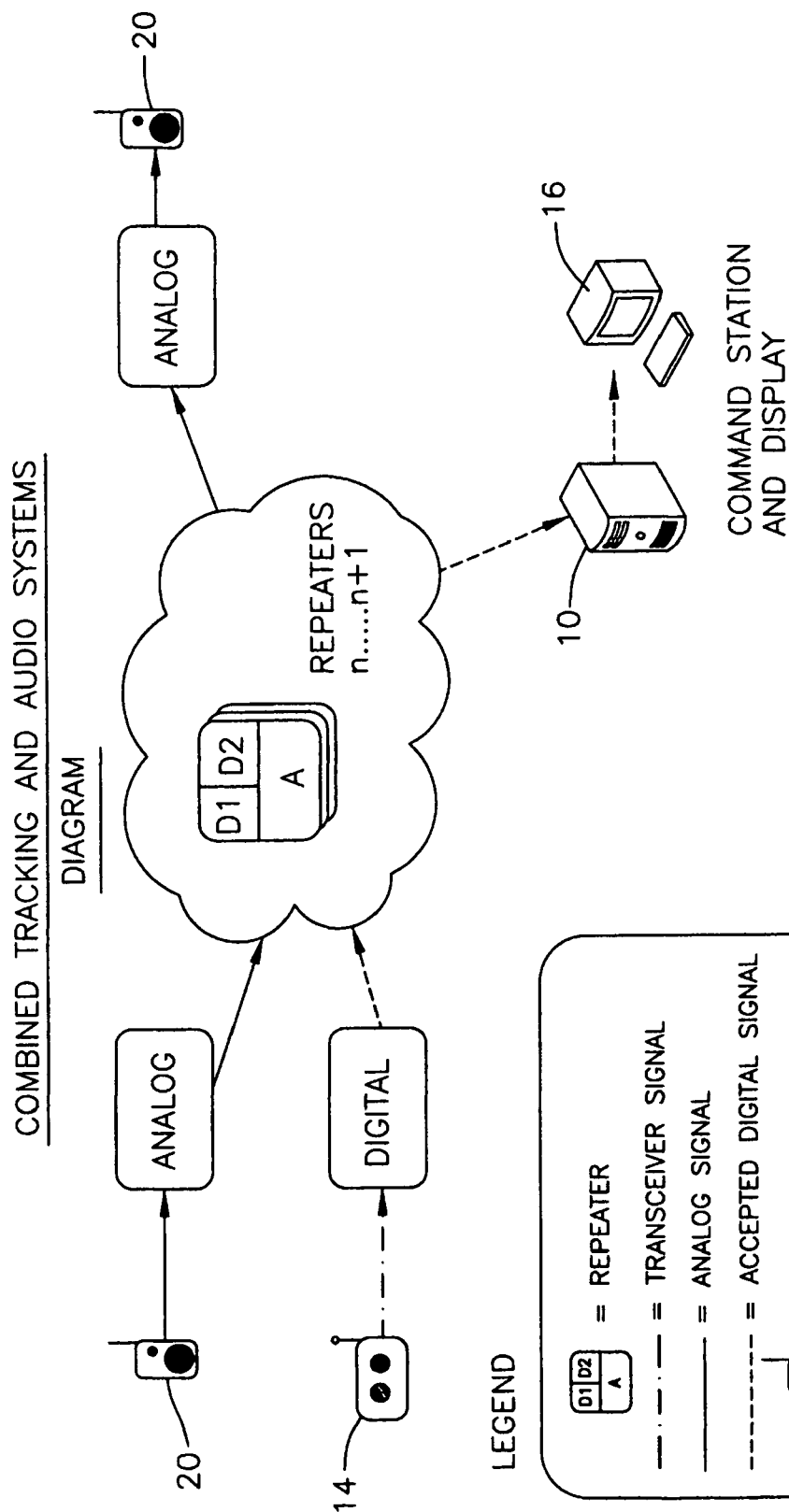
FIG. 4 is a system diagram illustrating the combined tracking system and the audio system as part of an overall dual system arrangement.

FIG. 4 schematically indicates the combined FIG. 2 and FIG. 3 systems. In FIG. 4, mobile voice communication devices 20 transmit along an analog channel to various repeaters and receive along an analog channel from those repeaters.

Similarly, tracking information is transmitted along a digital channel from portable transceivers 14 through various repeaters to the command station 10 and the display unit 16.

Repeaters 12, 18 are schematically shown. The analog channel A is the front channel for the audio system. The digital channel D1 is the front channel for the tracking system. The digital channel D2 is shown as a combined back channel for the audio and tracking systems because those two back channels could be multiplexed as two sub-channels of a single channel.

Figure 5:
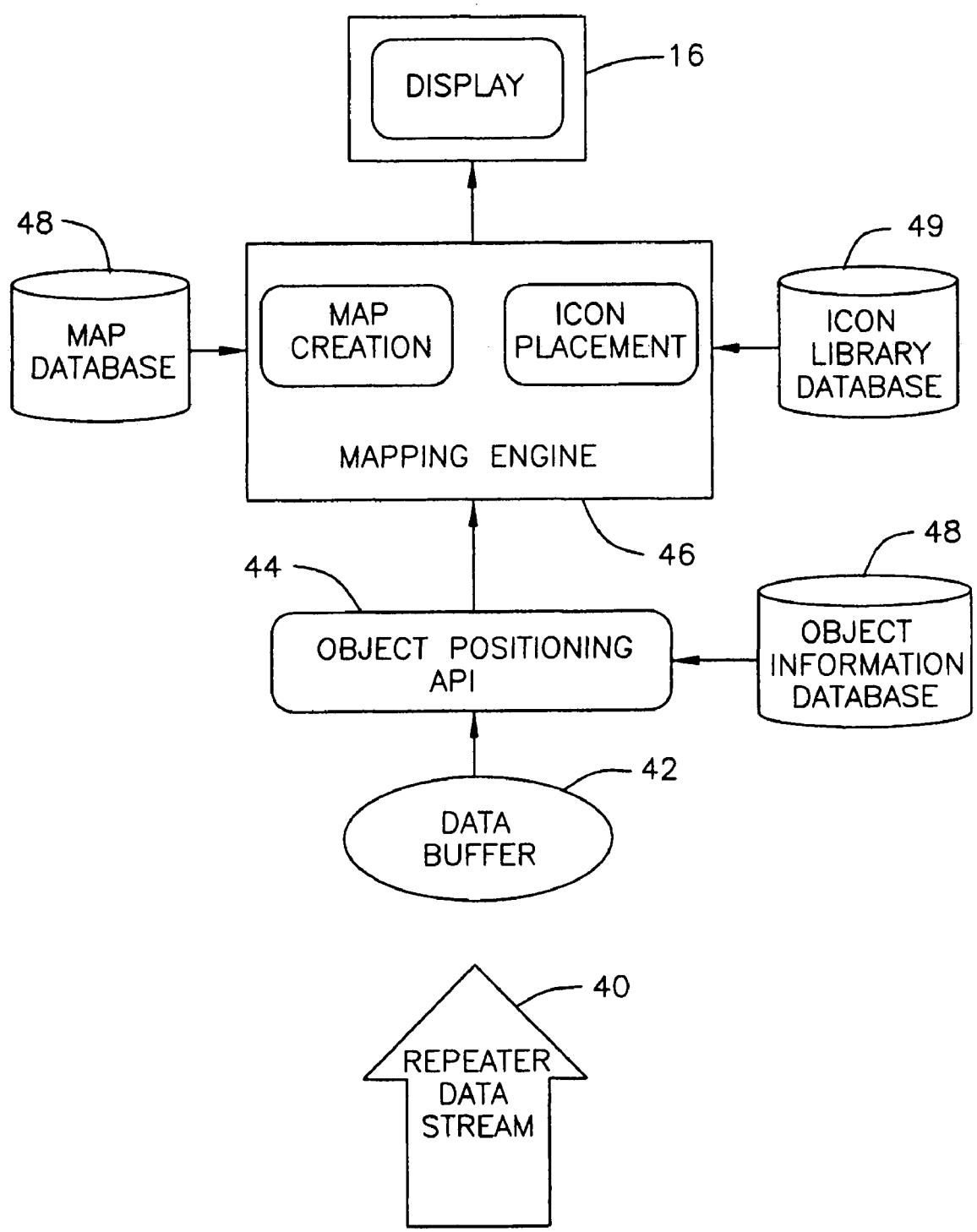
FIG. 5 is a tracking software process flow diagram.

As shown in FIG. 5, the tracking system software receives a data stream 40 from the wireless tracking repeater units. This data stream is held in a temporary data buffer 42 until it is processed. When it is ready to be processed, the data stream moves from the data buffer 42 into the transceiver positioning application protocol interface API 44, which processes the data, extracting the positioning information and other metadata about the transceiver 14, such as the ID number of the tracked transceiver. The transceiver positioning API 44 then processes and converts the positioning data into a format that can be understood by the mapping engine 46 and polls the transceiver information database 48 for any additional information about the transceiver, appending it to the metadata as needed. The new data is then sent to the mapping engine 46 where the correct map is pulled from the map database 48 and the icon for the tracked transceiver is pulled from the icon library database 49. The Mapping Engine 46 then positions the icon for the tracked transceiver on the map in the correct location based on the coordinate data sent by the object positioning API 44. Once positioning of the tracked transceiver icon is complete, the map with the correctly positioned tracked transceiver is then output to a display.

Figure 6:
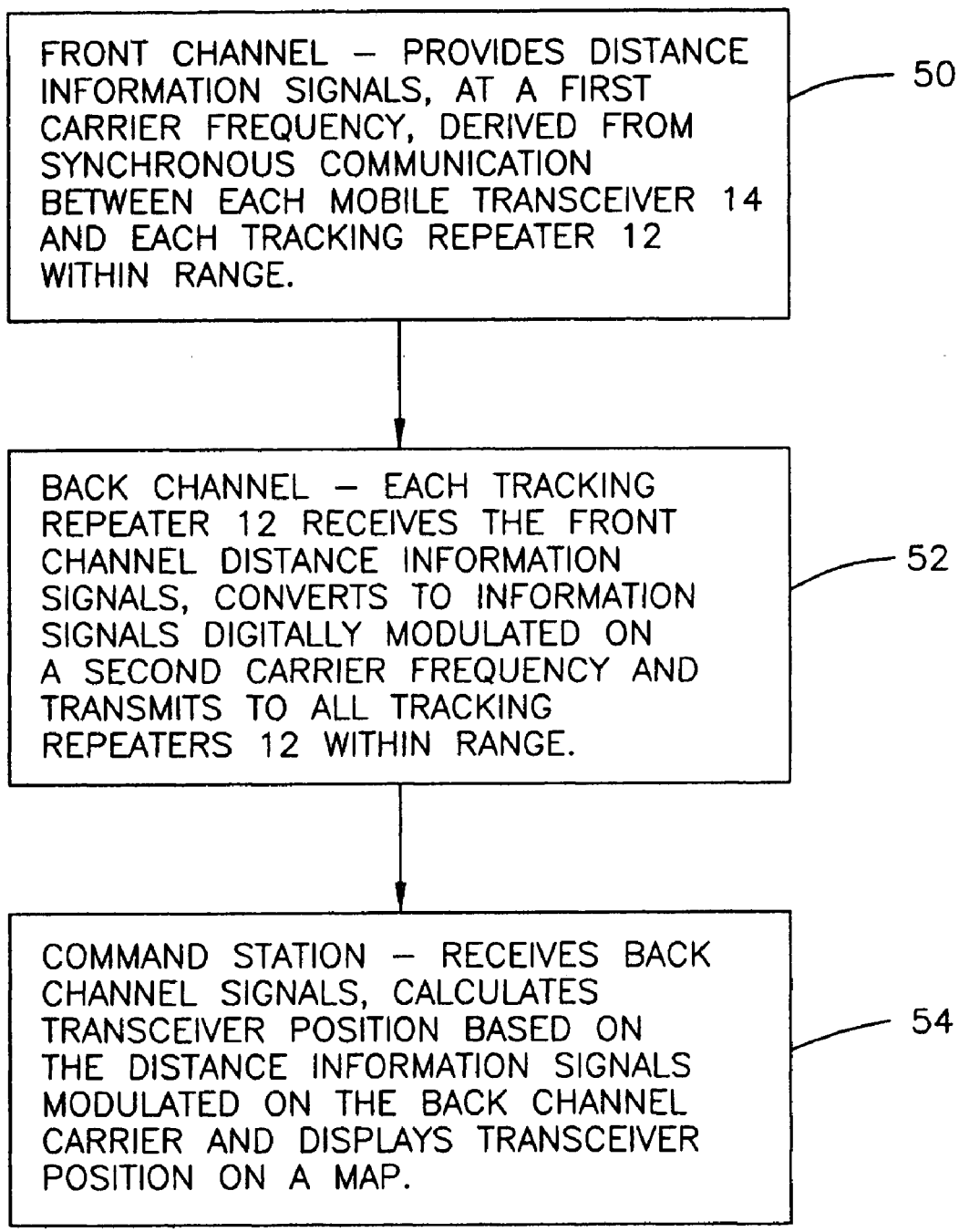
FIG. 6 is a flow chart of the tracking system showing processing of distance information from transceiver to front channel to back channel to command station.
Figure 7:
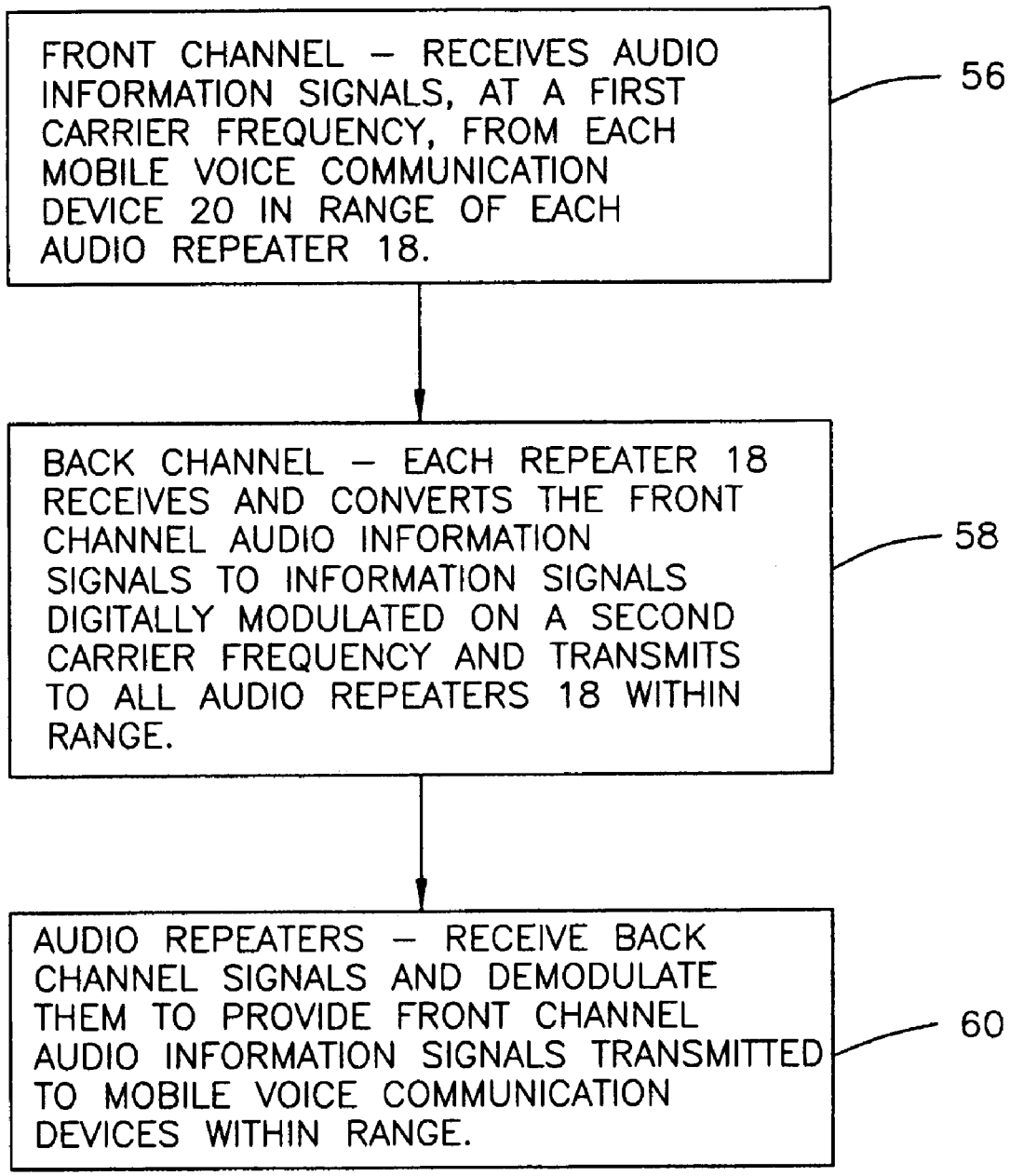
FIG. 7 is an audio system flow chart showing the processing of audio information from mobile voice communication devices to front channel to back channel to other mobile voice communication devices.

FIGS. 6 and 7 summarize the two systems described above. Both have front and back channels and provide information to the command station.

With reference to FIG. 6, the front channel box 50 illustrates the tracking system front channel processing. The front channel is a carrier for communication between tracking repeaters 12 and the mobile tracking transceivers 14. This communication provides distance signal information.

The back channel box 52 illustrates back channel processing, which is a technique for getting this distance information passed around through the various repeaters 12 so that the distance information ultimately reaches the command station 10 for the processing indicated at box 54. The back channel 52 operates on a different carrier signal frequency than does the front channel 50.

The command station 10 uses the distance information in order to provide position information for the transceivers 14 so that they can be displayed on a map of the structure involved.

FIG. 7 illustrates the main signal processing in the audio system. A front channel box 56 illustrates the front channel process. The front channel carries audio information received from mobile voice communication devices. The back channel 58 then takes this information and, on a separate carrier frequency, transmits the audio information around through the audio system repeaters (see box 60) so that ultimately it is received at all of the mobile voice communication devices.

The preferred embodiment of the system of this invention has been described. However, within the system there are certain presently preferred arrangements or structures for achieving certain results of the system.

For example, a presently preferred mode of transmitting information from repeater to repeater is illustrated in U.S. Pat. No. 6,463,090 issued Oct. 8, 2002 and entitled: Communication In High Rise Buildings. The contents of this patent are incorporated herein by reference.

A type of mapping technique for producing such at the command station 10 is described in U.S. patent application Ser. No. 11/212,415 filed on Aug. 26, 2005 entitled: Way Finding System. This application is incorporated herein by reference.

However, it should be understood that the system of this invention as claimed and employing the methods claimed can be operated without necessarily employing these preferred techniques.

While the foregoing description and drawings represent the presently preferred embodiments of the invention, it should be understood that those skilled in the art will be able to make changes and modifications to those embodiments without departing from the teachings of the invention and the scope of the claims.

What is claimed is:

1. A personnel tracking system for real time tracking of personnel as they move through a complex structure network comprising:

a plurality of electronic tracking repeaters located at predetermined positions throughout the structural network, a portable tracking transceiver carried by each individual being tracked, and a command station, a front tracking communication channel for communication between each of said transceivers and each of said repeaters in range of a transceiver to provide a first distance information signal indicating the distance between a transceiver and each repeater in communicating range, a back tracking communication channel for communication between said repeaters to provide a second distance information signal transmitted between repeaters within range and to said command station from repeaters within range of said command station, said front channel and said back channel operating on different carrier frequencies, means at said command station to calculate the real time position of the individual carrying said transceiver based on the distance information provided by said distance information signals on said back channel, and means to display said individual position on a map of the structure within which the individual is moving, said first channel communication and said back channel communication being wireless.

2. The personnel tracking system of claim 1 wherein: said communication between transceivers and repeaters and said communication between repeaters is by digital modulated signals.

3. The personnel tracking system of claim 1 wherein:

said command station includes means to communicate with said repeaters to provide power management and status information.

4. The personnel tracking system of claim 2 wherein:

said command station includes means to communicate with said repeaters to provide power management and status information.

5. The personal tracking system of claim 1 wherein: said distance information signal includes an identifying header to enable termination of retransmission of a distance information signal received a second time.

6. The personal tracking system of claim 4 wherein: said distance information signal includes an identifying header to enable termination of retransmission of a distance information signal received a second time.

7. A system having personnel tracking and voice communication capabilities comprising:

The tracking system of claim 1, and an audio communication system comprising:

a plurality of audio repeaters located at predetermined positions throughout the structural network, a front audio communication channel for communication between individually carried mobile voice communication devices and said audio repeaters within range to provide an audio modulated first information signal, a back audio communication channel for communication between said audio repeaters to provide an audio modulated second information signal which is communicated between repeaters within range, said audio repeaters providing a front channel audio modulated information signal which is communicated to whatever mobile voice communication devices are in range, said front audio channel and said back audio channel operating on different carrier frequencies.

8. The system of claim 7 wherein said communication on said front audio channel is with an analog modulated signal and said communication on said back audio channel is with a digital modulated signal.

9. The system of claim 7 wherein: said command station includes means to communicate with said audio repeaters to provide power management and status information.

10. The system of claim 8 wherein: said command station includes means to communicate with said audio repeaters to provide power management and status information.

11. The method of real time tracking of the position of an individual moving through a complex structural network comprising the steps of:
    positioning a plurality of electronic tracking repeaters at predetermined locations throughout said structural network,
    carrying a portable tracking transceiver on the individual being tracked,
    communicating between said portable transceiver and at least two of said repeaters to provide an information signal on the distance between said portable transceiver and each of said repeaters with which said portable transceiver is in communication,
    transmitting said distance information from each of said repeaters to repeaters in range to provide a distance information signal at a command station,
    calculating the real time position for the individual carrying the transceiver based on the distance information that is provided by said repeaters to said command station, and
    displaying the position of the individual on a map of the structural network within which the individual carrying the transceiver is moving.

12. The tracking method of claim 11 wherein said step of transmitting said distance information includes the step of receiving and retransmitting said distance information to each of said tracking repeaters within range to assure receipt of said information for said step of calculating.

13. The tracking method of claim 11 further comprising the step of:
    communicating with said tracking repeaters to determine repeater status and provide power management.

14. The tracking method of claim 12 further comprising the step of:
    communicating with said tracking repeaters to determine repeater status and provide power management.

15. The personnel tracking and voice communication method comprising the steps of:
    performing the tracking method of claim 11,
    positioning a plurality of electronic audio repeaters at predetermined locations throughout said structural network,
    receiving on a front channel of said audio repeaters audio information from whatever mobile voice communication devices are in range,
    transmitting on a back channel of said repeaters said audio information to whatever repeaters are in range,
    transmitting on a front channel of said repeaters said audio information to whatever mobile voice communication devices are in range.

16. A personnel tracking system for real time tracking of personnel carrying a portable tracking transceiver as they move through a complex structure network comprising:
    a plurality of electronic tracking repeaters located at predetermined positions throughout the structural network,
    a command station,
    a front tracking communication channel for communication between a transceiver and each of said repeaters in range of a transceiver to provide a first distance information signal indicating the distance between a transceiver and each repeater in communicating range,
    a back tracking communication channel for communication between said repeaters to provide a second distance information signal transmitted between repeaters within range and to said command station from repeaters within range of said command station,
    said front channel and said back channel operating on different carrier frequencies,
    means at said command station to calculate the real time position of the individual carrying a transceiver based on the distance information provided by said distance information signals on said back channel, and means to display said individual position on a map of the structure within which the individual is moving,
    said first channel communication and said back channel communication being wireless.

\* \* \* \* \*